Re. 24,719
June 18, 1957　　　　E. E. CLINE ET AL　　　　2,796,183
TOWING HITCHES
Filed Sept. 7, 1954　　　　　　　　　　　3 Sheets-Sheet 1
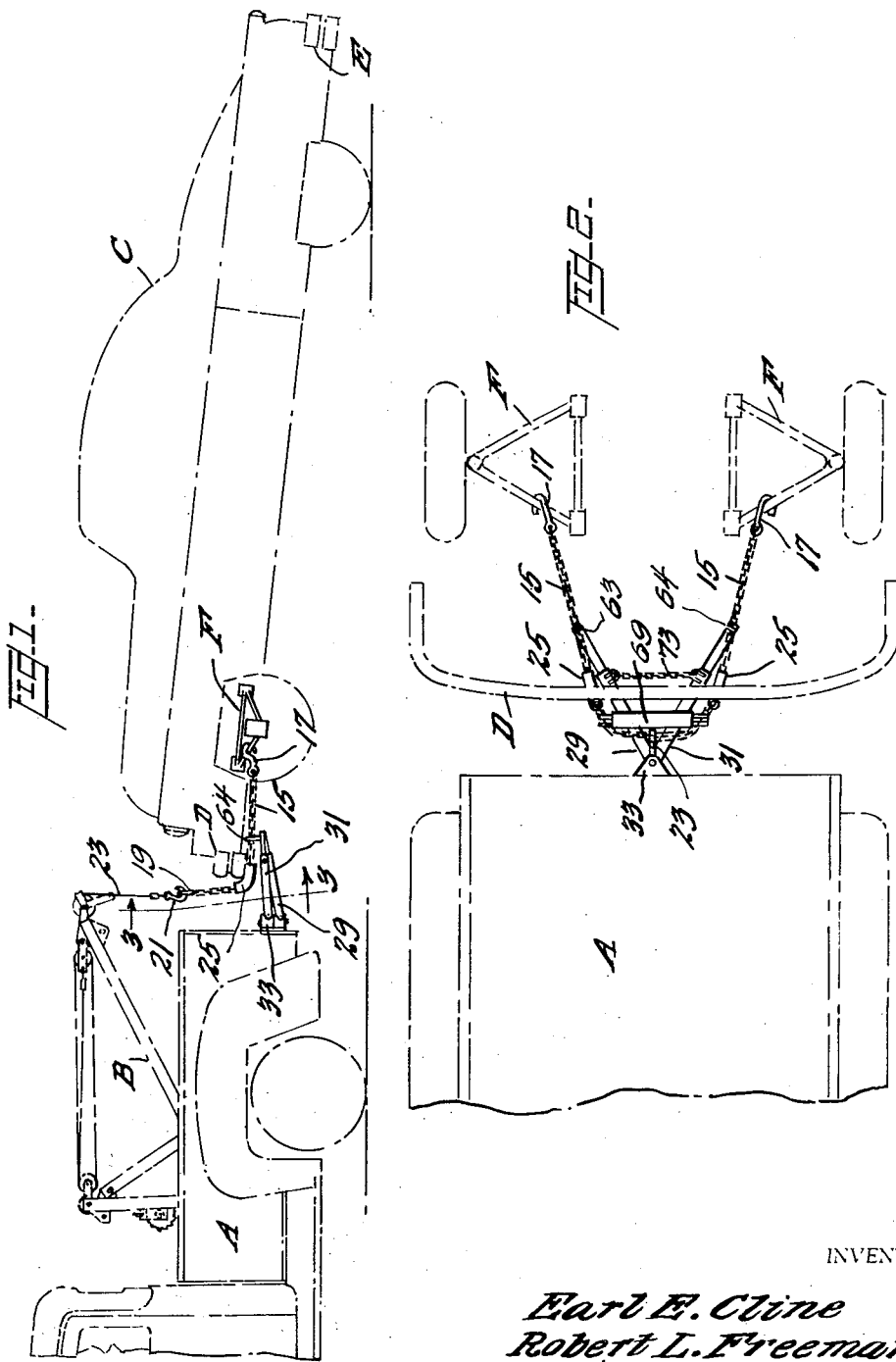
INVENTORS
Earl E. Cline
Robert L. Freeman,
BY Morris & Bateman
ATTORNEYS

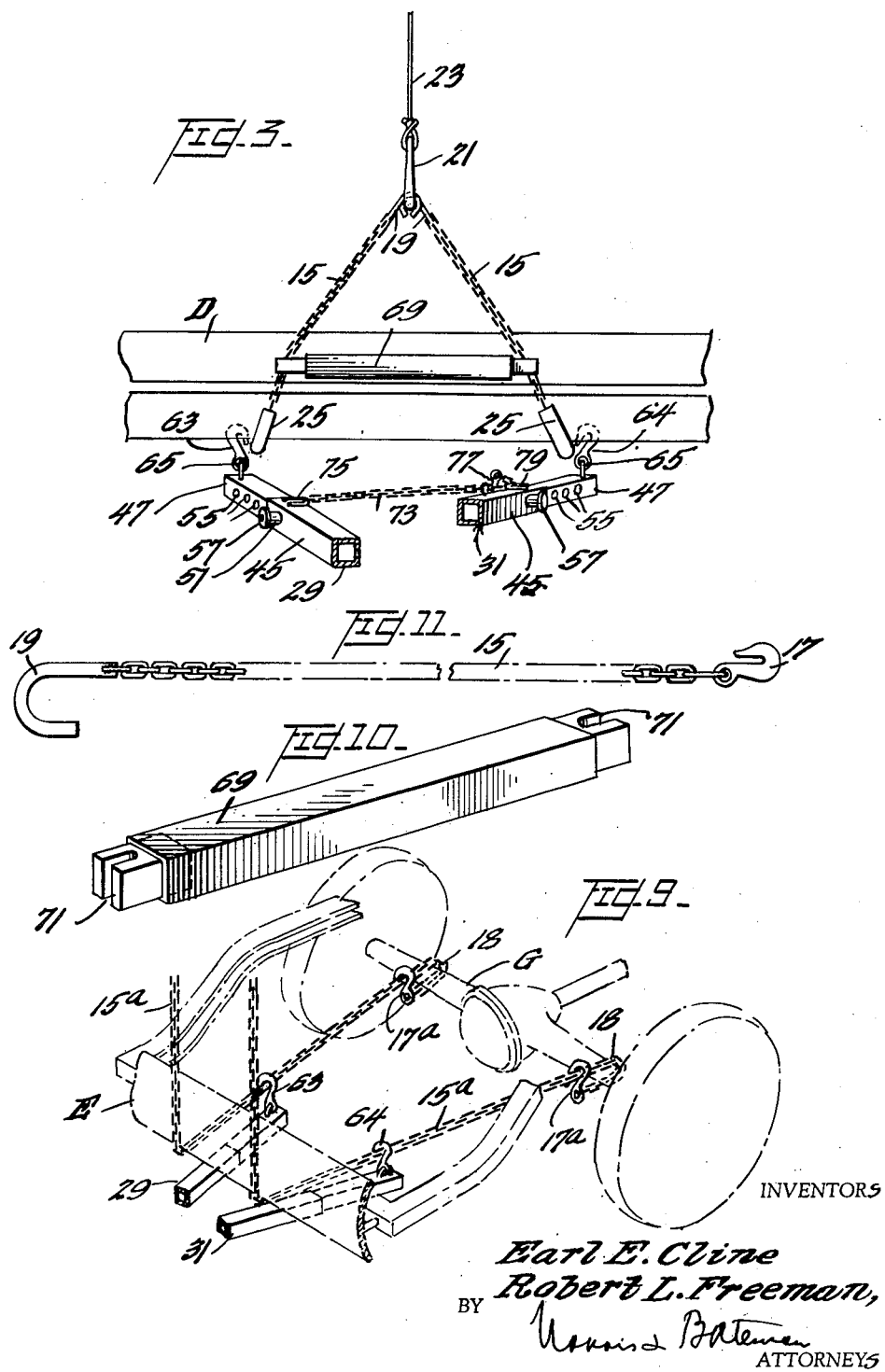

June 18, 1957 E. E. CLINE ET AL 2,796,183
TOWING HITCHES
Filed Sept. 7, 1954 3 Sheets-Sheet 3
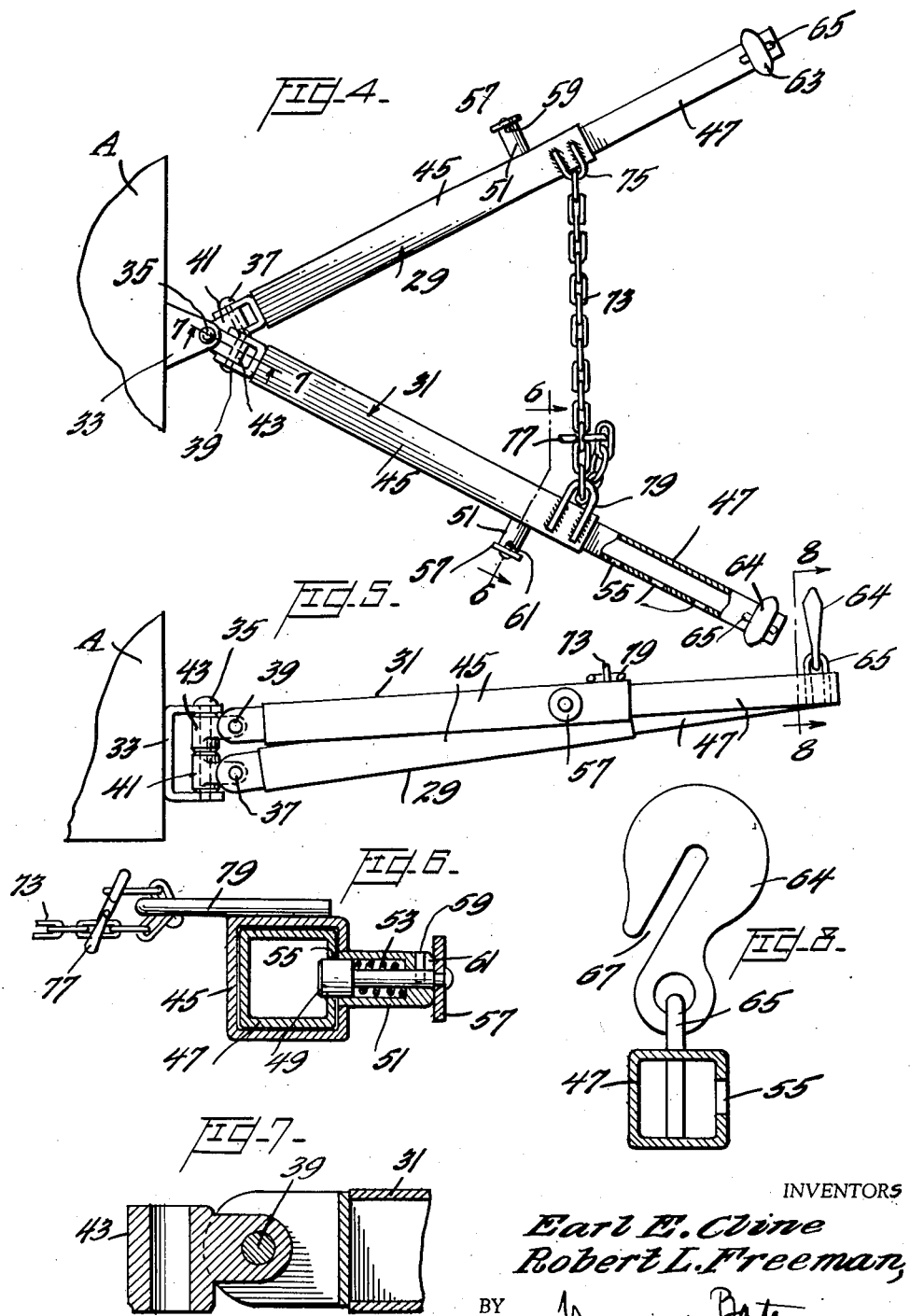
INVENTORS
Earl E. Cline
Robert L. Freeman,
BY
ATTORNEYS United States Patent Office 2,796,183
Patented June 18, 1957

2,796,183

TOWING HITCHES

Earl E. Cline and Robert L. Freeman, Chattanooga, Tenn., assignors to Ernest Holmes Company, a corporation of Tennessee Application September 7, 1954, Serial No. 454,456

7 Claims. (Cl. 214—86)

The present invention relates to towing hitches and more especially to those of the type adapted for the towing of automobiles, trucks and other motor vehicles by wreckers or cranes, and the primary object of the invention is to provide an improved towing hitch which may readily be attached to either the front or the rear end of motor vehicles of modern design to which towing hitches of the types previously used are not applicable, and which is capable of towing such vehicles without permitting forward or rearward lurching or side sway of the towed vehicle.

The usual method of towing a disabled automobile, truck or other motor vehicle has generally been to attach a cable, chain or other means to the disabled vehicle and to the crane of a wrecker and to thereby suspend an end of the disabled vehicle for towing, but unless suitable spacing means is provided between the disabled vehicle and the wrecker, the disabled vehicle, during towing, will lurch forwardly or rearwardly, due to changes in speed of the wrecker or unevenness of the road or other surface over which the vehicle is being towed, and the towed vehicle may also sway laterally, such lurching being liable to cause damage to the vehicle being towed, and side sway of the towed vehicle is likely to cause collision thereof with a passing vehicle.

Such faults in towing hitches as heretofore used generally have been avoided by employing a towing head substantially as disclosed in Patent No. 1,435,063, dated November 7, 1922, in the towing of disabled automobiles of the older designs to which such a towing head could be attached without difficulty, but the low bumpers, gas tanks and other parts at the front and rear of automobiles of modern designs present obstructions to the attachment of such a towing head thereto.

The present invention provides a novel and improved towing hitch which may be attached readily and without difficulty to either the front or rear end of automobiles, trucks or other motor vehicles of modern designs, and which is capable of suspending an end of such a vehicle and of towing it while preventing excessive forward or rearward lurching or side sway of the towed vehicle.

To these and other ends, the invention consists in certain improvements and combinations and arrangements of parts, all of which will be hereinafter more fully described, the features of novelty being pointed out more particularly in the claims at the end of this specification.

Iu the accompanying drawings—

Figure 1 is a side elevation of the improved towing hitch attached to a wrecker and to an automobile to be towed thereby.

Figure 2 is a top plan view on an enlarged scale of the hitch and portions of the wrecker and the automobile to be towed.

Figure 3 is a vertical section taken on the line 3—3 in Fig. 1.

Figure 4 is a top plan view, partly in section, of the tow bars employed according to the present invention.

Figure 5 is a side elevation of the tow bars shown in Fig. 4 as viewed from the lower side of that figure.

Figure 6 is a detail section on the line 6—6 in Fig. 4.

Figure 7 is a detail section on the line 7—7 in Fig. 4.

Figure 8 is a detail section on the line 8—8 in Fig. 5.

Figure 9 is a diagrammatic view showing the hitch attached to a solid axle such as the rear axle of an automobile or an axle of a truck.

Figure 10 is a perspective view of the spacer for the sling chains.

Figure 11 is a detail view of one of the sling chains.

Similar parts are designated by the same reference numerals in the several figures.

In the accompanying drawings, A represents generally part of a wrecker which may be of the type disclosed in Reissue Patent No. 14,720, dated September 2, 1919, having a crane B mounted thereon and which may be substantially of the construction shown in said reissue patent, and C represents an automobile of modern design which is to be towed, such automobile having relatively low front and rear bumpers D and E rigidly fixed thereto, and F represents a "knee action" suspension which may be of any of the usual constructions generally used for the front wheels of modern automobiles.

According to the present invention, a pair of flexible suspension members, which are preferably in the form of sling chains 15, are provided for attaching, suspending and towing the disabled vehicle. The sling chains to be used for automobiles of modern conventional construction preferably have an ordinary pick-up hook 17 secured to one end adapted to be engaged with the usual "knee action" suspension F of the front axle, bumper brackets or any other accessible parts of the automobile at the end thereof to which the hitch is to be attached, and the other ends of the sling chains are each provided with means, such as a hook 19, for engagement with a hook 21 on the service cable 23 of the crane of the wrecker.

In applying the sling chains to the front end of an automobile, the hooks 17 on these chains are engaged with the "knee action" suspensions at the respective ends of the front axle or other suitable and accessible part of the disabled automobile, and the chains are extended forwardly under the bumper D and then upwardly in front of the front bumper, and the hooks 19 on the upper ends of the sling chains are attached to the hook 21 on the service cable 23 of the wrecker.

Winding of the service cable 23 by operation of the crane on the wrecker will tension the sling chains and lift the end of the automobile to which these chains are attached, the lifting force thus applied being sustained by the bumper, the bumpers of modern automobiles being secured thereto with sufficient firmness to sustain such a force. A tubular sleeve 25 of rubber or other suitable material may be placed over each sling chain in position to engage the bumper to avoid damaging it.

If the rear end of an automobile is to be lifted and towed, a pair of sling chains 15a each having a grab hook 17a attached to one end thereof may be securely attached to the solid rear axle G of the automobile by looping the ends of the chains carrying the grab hooks around the rear axle toward its respective ends, as indicated at 18 and the grab hooks engaged with links of the chains to secure the looped portions of the chains on the axle. The sling chains, in this instance, are extended rearwardly under the rear bumper E and then upwardly, and attached to the hook 21 on the service cable of the wrecker, and the rear end of the disabled automobile is lifted by winding of the service cable 23 by operation of the crane on the wrecker.

However, suspension of either end of an automobile or other vehicle by the sling chains alone will not prevent forward or rearward lurching or side sway of the disabled vehicle while being towed, and the present invention provides means to cooperate with the sling chains to prevent such lurching or side sway. Such means comprises a pair of tow bars 29 and 31 the forward ends of which are pivotally connected to the rear end of the wrecker centrally between its sides by means of a bracket 33 which is bolted or otherwise securely fixed to the wrecker and supports a vertical pivot pin 35. The forward end of each tow bar is connected by a horizontal pivot 37 or 39 to a swivel 41 or 43 which is rotatable on the vertical pivot pin 35. The tow bars thus have universal connections to the wrecker which enables them to be adjusted to vary the angle between them horizontally, and to compensate for relative vertical movements between the rear end of the wrecker and the adjacent end of the vehicle which is being towed. The bracket 33 is mounted at a suitable height on the rear of the wrecker to support the tow bars at a height to extend under the bumper of a disabled automobile, and the tow bars are adjustable in length to enable them to be extended a suitable distance beyond the bumper and into a position between the bumper and the part of the disabled automobile to which the hooks on the sling chains are attached.

Preferably and as shown in the present instance, each of the tow bars is composed of an outer tubular section 45 to which the respective swivel 41 or 43 is connected, and an inner section 47 which telescopes and is slidable within the outer section. Suitable means are provided for locking the tow bar sections in different relatively adjusted positions according to the desired length of the tow bars, such locking means as shown comprising a locking plunger 49 on each outer section 45 which is slidable in a casing 51 welded on the respective outer section and is urged by a coiled compression spring 53 into one or another of a series of holes 55 spaced longitudinally of the respective inner section 47, a disc 57 being fixed to the outer end of the plunger for retracting it to unlock the inner section to permit adjustment thereof. The outer and inner sections of each tow bar are preferably square or rectangular in cross-section so that the inner section can not rotate within the outer section. The plunger 49 has a pin 59 fixed thereto and projecting radially therefrom and positioned to enter a slot 61 in the outer edge of the casing 51 when the plunger is rotated into one position, thereby permitting the plunger to enter a selected hole 55 in the inner section and thereby lock it in adjusted position, the pin withdrawing from the slot 61 when the plunger is retracted, and by rotating the plunger a quarter turn while it is retracted, the pin 59 will engage the outer end of the casing 51 and thereby retain the plunger in retracted position, which will facilitate adjustment of the inner section. After the inner section of each tow bar has been adjusted for the desired length of the tow bar, rotation of the plunger to bring the pin 59 into register with the slot 61 will release the plunger and permit the spring 53 to project the plunger into the appropriate hole in the inner section and thereby lock the latter.

According to the present invention, means are provided for securing the tow bars at or near their free ends to the respective sling chains to prevent forward or rearward lurching of the disabled vehicle while it is being towed. Preferably and as shown in the present instance, such means comprise grab-hooks 63 and 64 which are pivotally secured to the upper sides of the inner tow bar sections 47 by suitable means such as U-bolts 65 which preferably extend through the respective inner sections and are welded thereto, as shown in Fig. 8. Each of these grab-hooks has a throat 67 adapted to receive any of the links of the respective sling chain which extends above the free end of the respective tow bar and thereby provide a secure connection therewith. Since these grab-hooks are securely anchored to the wrecker through their respective tow bars, they will effectively resist forces applied in a forward or rearward direction to the portions of the sling chains extending under the bumper of the disabled vehicle and thereby prevent excessive forward or rearward lurching of the disabled vehicle while it is being towed. In order to position the sling chains so that they will extend over the free ends of the tow bars for engagement by the grab hooks thereon, a spacer bar 69 is provided which has slots 71 in its ends for engagement with links of the sling chains when interposed between these chains at a suitable distance below the hook 21 of the service cable.

In order to prevent side sway of the disabled vehicle while it is being towed, a spacing connection is provided between the tow bars to limit the spreading apart thereof. Such spacing connection comprises preferably a chain 73 having an end linked to the outer section of one of the tow bars, as by a U-bolt 75 welded thereto, and having a grab-hook 77 attached to its other end, the grab-hook being of a size to pass through a U-bolt 79 welded to the outer section of the other tow bar and hooked on a link of the spacer chain, as shown in Fig. 6. As the tow bars are secured by the grab-hooks 63 and 64 to the sling chains at points between the bumper under which the sling chains pass and the attachments of the sling chains to the vehicle being towed, side sway of the towed vehicle is effectively resisted, although the tow bar structure may swing bodily about its vertical pivot 35 to compensate for angularity between the towed and towing vehicles while turning from a straight course.

As the sling chains are flexible, they may readily be extended beneath the bumper or low parts of an automobile of modern design, and they will accommodate themselves to the position of the bumper while an end of a disabled vehicle is being lifted and suspended, and the grab-hooks on the tow bars may be engaged with the portions of the sling chains extending under the bumper without difficulty, this operation being facilitated by lifting the tow bars to engage the grab-hooks with the sling chains, which is permitted by the horizontal pivots on which the tow bars are mounted.

It will be understood that during towing, the towing force is applied by the wrecker to the tow bars which are secured thereto, and that the towing force is transmitted by the tow bars to the towed vehicle through the grab-hooks secured to the tow bars and by the grab-hooks to the sling chains with which the grab-hooks are engaged. As the portions of the sling chains which extend under the bumper of the towed vehicle are each secured at one end to the towed vehicle and at the other end to the service cable of the crane on the wrecker, these portions of the sling chains will be held taut under the weight of the lifted end of the towed vehicle. Therefore, any tendency of the towed vehicle to lurch forwardly against the wrecker will apply tension to the portions of the sling chains between the grab-hooks on the tow bars and the bumper of the towed vehicle and such lurching will be resisted by these portions of the sling chains, and any tendency of the towed vehicle to lurch rearwardly or to drag behind the wrecker will apply tension to the portions of the sling chains between the grab-hooks on the tow bars and the attachments of the sling chains to the towed vehicle and such lurching or dragging of the towed vehicle will be resisted by these portions of the sling chains. The adjustment of the length of the tow bars enables the grab-hooks thereon to be located in the appropriate positions behind the bumper of various vehicles to be towed in order to accomplish this result. Forward or rearward lurching of the towed vehicle is therefore effectively resisted, so that damage of the towed vehicle is thus avoided.

What we claim is:

1. A towing hitch for vehicles, comprising a pair of sling chains adapted to extend under and behind the bumper of a vehicle to be towed and having means for attaching them behind said bumper to such vehicle, and adapted for connection to means for applying a lifting force to the sling chains in front of the bumper and for applying tension to portions of the chains between the bumper and their points of attachment to such vehicle, a pair of tow bars having means for connecting them to a towing vehicle in a position to extend under and behind the bumper of the vehicle to be towed, and grab-hooks secured to the upper sides of the tow bars and engageable with links of the respective sling chain at points between the bumper of the vehicle to be towed and the points of attachment of the sling chains thereto to resist relative forward and rearward movements between the vehicles.

2. A towing hitch for vehicles as defined in claim 1, wherein said tow bars are adjustable in length to enable the grab-hooks thereon to be located behind the bumper of the vehicle to be towed.

3. A towing hitch as defined in claim 1 wherein said tow bars are connected pivotally to the towing vehicle for movement of the grab-hooks for engagement with the sling chains.

4. A towing hitch for vehicles, comprising a pair of flexible suspension members of a length to extend rearwardly under the bumper of a vehicle to be towed and to extend upwardly in front of such bumper, the rear ends of said members having means thereon for attachment to such vehicle in rear of its bumper and the upper ends of said members having means thereon for attachment to a crane on a towing vehicle for lifting an end of the vehicle to be towed and for applying tension to the portions of said members extending between the bumper and the points of attachment of said members to the vehicle to be towed, a pair of tow bars having means for connecting their forward ends to a vertical pivot on the towing vehicle in a position to extend rearwardly therefrom in divergent relation under the bumper of the vehicle to be towed, and means at the ends of the tow bars remote from said pivot positioned to grip portions of said members between their points of attachment to the vehicle to be towed and the bumper thereof for transmitting towing force from the towing vehicle to said portions of said members and for resisting lurching of the towed vehicle toward the towing vehicle.

5. A towing hitch for vehicles, comprising flexible suspension members having means for suspending them to extend downwardly from lifting means on a towing vehicle and having portions to extend under and beyond the bumper toward the chassis substantially longitudinally of a vehicle to be towed and having means at the ends of such longitudinally extending portions for attachment to the chassis of the vehicle to be towed, a pair of tow bars having means for connecting them to the towing vehicle in a position to extend under and beyond the bumper toward the chassis of the vehicle to be towed, and means secured to the tow bars and engageable with the respective longitudinally extending portions of the suspension members at points intermediately between the bumper and the points of attachment of the ends of the longitudinally extending portions of said members to the chassis of the vehicle to be towed for substantially preventing relative forward and reaward movement between the vehicles.

6. A towing hitch for vehicles, comprising a pair of sling chains having means for suspending portions thereof to extend downwardly from lifting means on a towing vehicle and having portions to extend substantially longitudinally of a vehicle to be towed and under and beyond the bumper toward the chassis thereof and having means at the ends of such longitudinally extending portions for attachment to the chassis of the vehicle to be towed, a pair of tow bars having means for connecting them to the towing vehicle in a position to extend under and beyond the bumper and toward the chassis of the vehicle to be towed, and means secured to the tow bars and engageable with links of the longitudinally extending portions of the respective sling chains at points intermediately between the bumper and the points of attachment of the ends of the longitudinally extending portions of the respective sling chains to the chassis of the vehicle to be towed for resisting forward or rearward lurching between the vehicles.

7. A towing hitch as defined in claim 6, wherein said means secured to said tow bars and engageable with said sling chains are loosely and pivotally connected to the respective tow bars.

References Cited in the file of this patent

UNITED STATES PATENTS

| | | |
|---|---|---|
| 1,435,063 | Holmes | Nov. 7, 1922 |
| 1,612,191 | Hubbard | Dec. 28, 1926 |
| 2,555,663 | Schouboe | June 5, 1951 |

FOREIGN PATENTS

| | | |
|---|---|---|
| 483,313 | Canada | May 20, 1952 |